United States Patent [19]

Cochran et al.

[11] Patent Number: 4,559,846
[45] Date of Patent: Dec. 24, 1985

[54] SYSTEM FOR SHIFTING A VEHICLE TO TWO OR FOUR-WHEEL DRIVE

[75] Inventors: Stephen C. Cochran; Francis J. Terwoerds, both of Toledo, Ohio

[73] Assignee: Dana Corporation, Toledo, Ohio

[21] Appl. No.: 550,316

[22] Filed: Nov. 10, 1983

[51] Int. Cl.⁴ .................... F16H 37/06; B60K 17/34
[52] U.S. Cl. ................... 74/665 GA; 74/477; 74/665 T; 180/247
[58] Field of Search ............ 180/247, 233; 74/665 F, 74/665 G, 655 GA, 655 GB, 655 GC, 655 GD, 655 T, 477

[56] References Cited

U.S. PATENT DOCUMENTS

| 822,057 | 5/1906 | Krebs | 74/477 |
|---|---|---|---|
| 2,385,231 | 9/1945 | Peterson et al. | 74/477 |
| 3,752,276 | 8/1973 | Hoyle et al. | 192/52 E |
| 3,788,164 | 1/1974 | Ojima | 74/665 T |
| 4,270,409 | 6/1981 | Glaze et al. | 74/665 GA |
| 4,305,309 | 12/1981 | Ookubo et al. | 74/477 |
| 4,305,490 | 12/1981 | Hendrickson | 180/247 X |
| 4,344,335 | 8/1982 | Kawai | 74/665 GA |

Primary Examiner—John A. Pekar
Attorney, Agent, or Firm—Charles F. Schroeder

[57] ABSTRACT

A gear transfer unit for selectively shifting an engine driven vehicle to either a two-wheel or four-wheel drive mode while in motion which unit includes a gear system of constant mesh gears, a synchronizer and means for activating the synchronizer for selective high and low speed coupling of the input drive to the front and rear output shafts of the unit.

15 Claims, 8 Drawing Figures

SYSTEM FOR SHIFTING A VEHICLE TO TWO OR FOUR-WHEEL DRIVE

BACKGROUND OF THE INVENTION

The present invention relates to power transfer systems for four-wheel drive automotive vehicles and more particularly to a transfer system which enables single control rod shifting of gears between two-wheel and four-wheel high speed drive modes while the vehicle is moving as well as shifting to a four-wheel low speed drive from a stop in addition to providing for release of stressed relationships in the gear system resulting from differentials in movement which may occur between the front and rear output shafts.

It is well established that four-wheel drive vehicles, although highly desirable for off-road travel over rough terrain, because of their greater reliability in traction under such conditions, are much more economically operable on hard, improved surfaces as a two-wheel conventional drive vehicle. Thus capability to shift from four to two-wheel driving and return is desirable.

Prior art gear transfer arrangements enable conversion of such vehicles to two-wheel or four-wheel drive, but have the disadvantage that the position of the locking drive hubs of the usual non-driven wheels must be manually locked or unlocked to correspond to the four or two-wheel drive shift control position selected. Thus conversion from two-wheel to four-wheel and return has been cumbersome, time-consuming and subject to error in combinations of settings required to obtain the wheel-driving relationships desired.

In addition, while operating the vehicle in a four-wheel driving mode, windup stresses are frequently experienced in the gear shifting systems, such as occur during turning of the vehicle. Windup stresses can result from the front wheels travelling over a different distance than the rear wheels during a turn, thereby causing a differential in rotation between the front and rear drive shafts of the gear transfer system. Shifting of gears from four to two-wheel drive under such conditions can be difficult if not impossible until the stresses have been relieved.

In view of the foregoing it is an object of the present invention to provide a transfer gear unit for shifting the driving mechanism of an automotive vehicle to either a two or four-wheel high speed drive mode from the other mode while the vehicle is in motion.

Still another object of the invention is to provide a transfer gear unit for shifting the driving mechanism to either a two or four-wheel drive mode with a single shift control rod without the need for setting external locking hubs on wheels of the vehicle when an internal locking axle, activated by the transfer gear unit is employed.

SUMMARY OF THE INVENTION

The above and other objectives hereinafter described are attained by providing a unit incorporating a five-gear transfer system which includes two sets of constant mesh gears, one set being a pair of axially moveable gears driven by the power input shaft of the unit and the other being a set of three axially fixed gears. A synchronizer also in the unit functions cooperatively with the second gear set to distribute the power input to the unit between the output shafts of the rear and front wheels.

Axial movement of the double gear set and actuation of the synchronizer is effected by positioning of a gear-shift lever which in turn positions a support rod for a pair of control forks mounted thereon.

One of the forks is fixed to the support rod and makes engagement with the double gear set to effect its axial movement for selection of the path over which power is supplied from the input shaft to either only the rear or to both the front and rear output shafts of the unit. The other fork is slideable over a range of the support rod to activate the synchronizer for four-wheel drive of the vehicle.

A spring between the two control forks is arranged to exert a biasing force acting on the slideable synchronizer fork which acts to deactivate the synchronizer in shifting from four-wheel to two-wheel drive, but only after release of windup stresses in the synchronizer occurs, thereby eliminating difficult if not impossible shifts between the four-wheel and two-wheel while the unit is in the high speed drive mode.

BEST MODE FOR CARRYING OUT INVENTION

Figure 1:
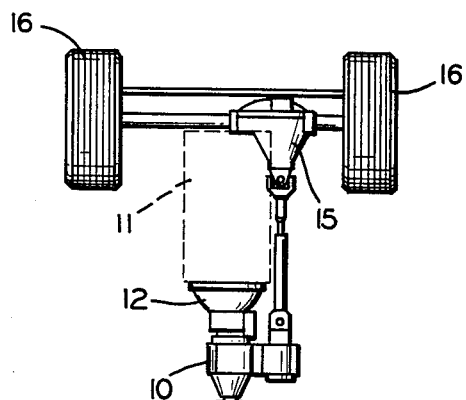
FIG. 1 is a partially schematic plan view of components of a four-wheel drive system for an automotive vehicle including a gear transfer unit of the present invention.

Referring to the drawings in greater detail, FIG. 1 shows a transfer unit 10 of the present invention positioned in a four-wheel vehicle behind the engine 11 and its transmission 12 having a tail shaft (not shown) to which the unit 10 is connected for receipt of engine driving power. Power is transmitted from the unit 10 to the rear wheels 14 through a differential 13 while power supplied to the front wheels 16 is supplied through a differential 15.

Figure 2:
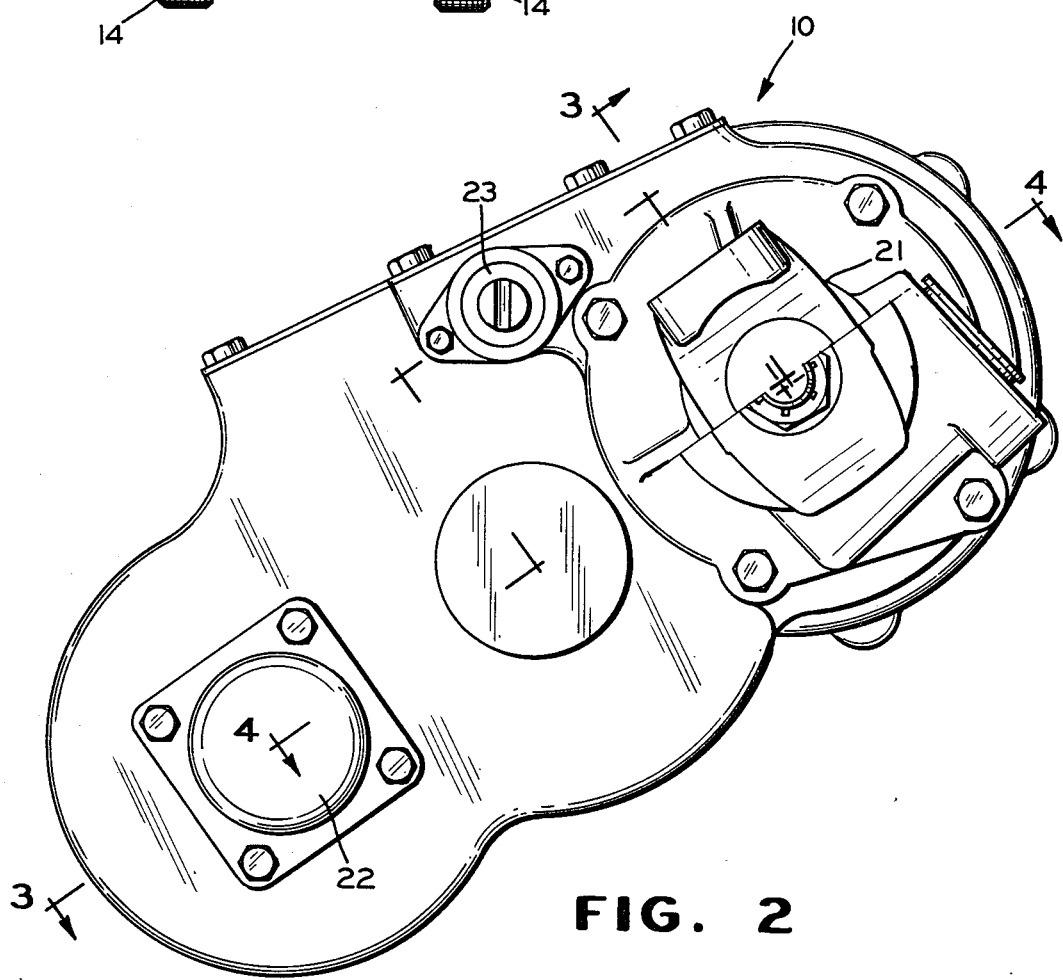
FIG. 2 is an enlarged and elevation view of the case for the four-wheel gear transfer unit of FIG. 1.
Figure 3:
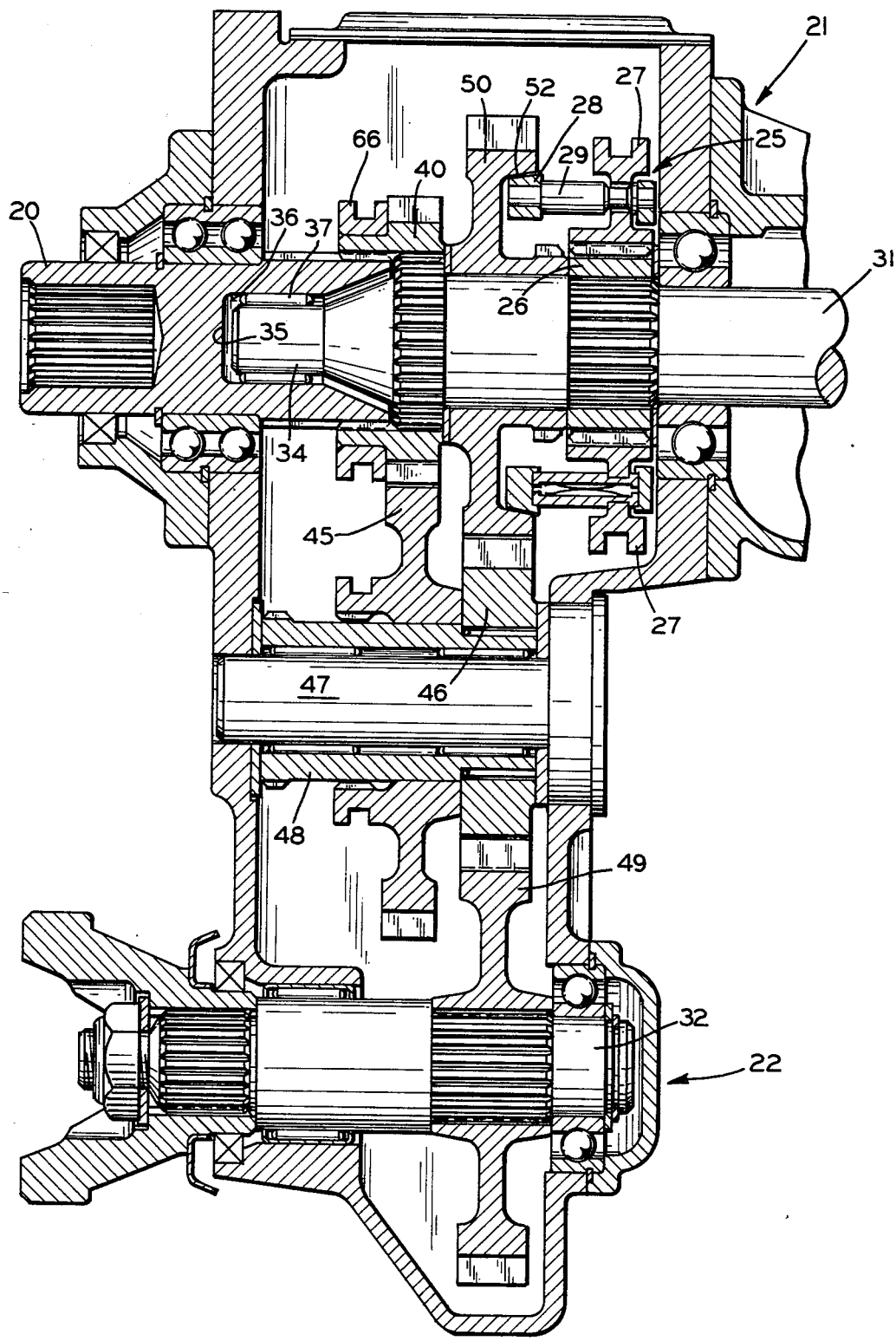
FIG. 3 is a cross sectional view of the transfer case shown in FIG. 2 showing the gear assembly as viewed on line 3—3.

FIG. 2 is an elevational view of the rear wheel drive end of the case 10 showing the rear wheel drive output section 21, the closed end of the front wheel drive section 22 and the shift-rod section 23. FIG. 3 is a cross sectional view of the case 10, as taken on line 3—3 showing the input drive shaft 20 and the associated gear assembly for driving the rear wheel and front wheel output shafts 31 and 32, respectively. The input drive shaft 20 is axially aligned with the rear output shaft 31, both shafts being rotatable independent of the other but interassociated by extension of a reduced diameter end portion 34 of the rear wheel drive shaft 31 into a hollow matching end portion 35 of the input shaft 20. A small gap 36 between the co-axial by aligned shafts provides space for a needle bearing 37 to provide mutual support for the two co-axially aligned shafts.

The gear assembly incorporates a pair of constant mesh gear sets one of which includes an input drive gear 40 which has an internally splined hub is mounted for slideable positioning on splined ends of the confronting shafts 20 and 31, and a low range idler gear 45 slideably positionable on a low range rotatable idler sleeve or shaft 48 mounted on a stationary support shaft 47. The set of gears 40 and 45 are laterally positionable in unison to permit shift of the gear assembly to high speed direct drive of the rear wheels 14 or high speed drive of all four wheels 14 and 16 as well as moving the assembly into a neutral position. The other set of constant mesh gears which are fixed in position include a rear output gear 50 mounted in freely rotatable relation on the rear output shaft 31, gear 50 being meshed with an intermediate idler gear 46 fixedly mounted on a bearing supported rotatable output idler sleeve or shaft 48 on a support 47, and a front output gear 49 mounted on the front output shaft 32 with the gear 49 also being meshed with the idler gear 46. The constant meshed relation of gears in the assembly promotes a uniform matched wear and consistant supply of power with consequent greater reliability in operation.

The gear assembly also includes a conventional type synchronizer 25 which has a collar 26 secured, such as in press-fit relation, on the rear output shaft 31, and a laterally slideable clutch collar or locking ring 27 splined on the collar 26. The locking ring 27 supports a series of blocking pins 29 which in turn support a clutching cone ring 28 arranged to make selective frictional driving engagement with a machine-finished overhanging inner rim surface 52 of the rear output gear 50.

Figure 4:
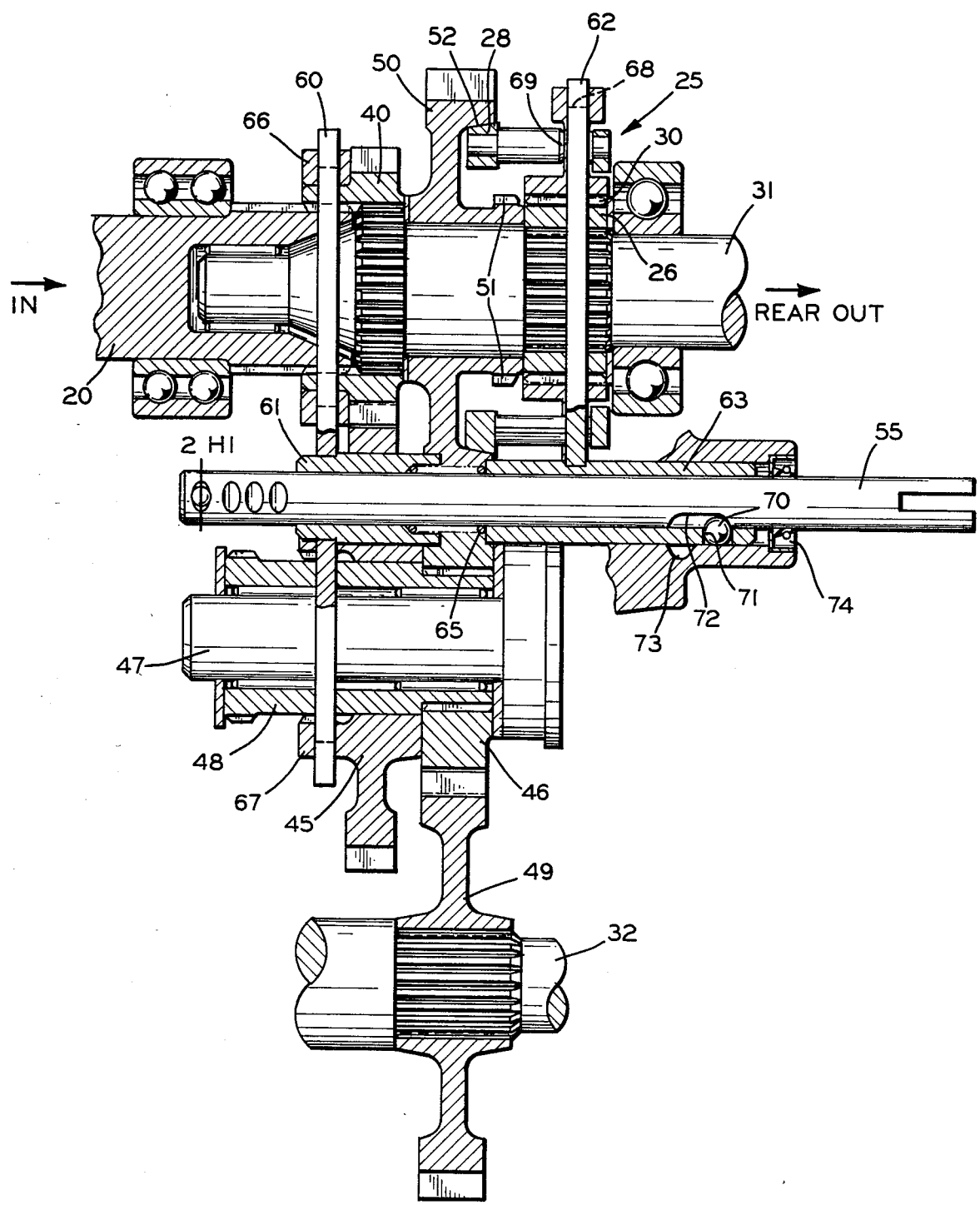
FIG. 4 is a cross sectional view of the transfer case of FIG. 2 as taken on line 4—4 showing the position of the shift-rod and shift forks for engagement of gears to effect direct two-wheel high speed rear drive of the vehicle.

FIG. 4 is a view of the gear assembly of FIG. 3 as taken on line 4—4 of FIG. 2 to illustrate the relation of the rod 55 to a gear-shift fork 60 and a synchronizer actuating fork 62 in the assembly. The gear-shift fork 60 is mounted in right-angular fixed relation on a support sleeve 61 which in turn is fixed to and moved with the rod 55. The shift-rod 55 is moveable lengthwise as shown in FIG. 4 by an external gear-shift control rod (not shown). The fork 60 is contoured to make engagement with a pair of grooved clutch collars 66 and 67 integrally associated with the slideable input drive gear 40 and its cooperating laterally slideable idler gear 45, respectively for selective repositioning of the gears 40 and 45 in unison upon movement of the fork 60 by the connected gear shift control rod. The synchronizer 25 is actuated by the fork 62 which is mounted in right-angular fixed relation on a support sleeve 63 mounted in longitudinally slideable relation on the gear shift rod 55 adjacent to the sleeve 61. A coil type biasing spring 65 is located between the ends of the two adjacent sleeves 61 and 63 to function in operation of the synchronizer as described hereinafter.

The fork 62 is contoured and arranged to make engagement with a peripheral groove 68 in the synchronizer locking ring 27 so that upon sliding movement of the sleeve 63, the locking ring is moved laterally a corresponding distance. In actuating the synchronizer, the sleeve 63, the fork 62, and the locking ring 27 are moved laterally toward the rear output-gear 50 under control of the shift-rod 55 thus causing the ring 27 to move over the length of the blocking pins 29 to cause clutching engagement of the adjacently positioned clutching ring 28 with the internal machine-finished rim 52 of the gear 50 thereby to bring the gear 50 up to speed in synchronism with that of the locking and clutching rings respectively. When the gear 50 and the clutching ring 28 are rotating at substantially the same speed during this actuating phase, the shift rod forces acting to move the locking ring toward the gear 50, cause the internal splines 30 of the locking ring to slide into engagement with matching teeth 51 distributed about the circumference of the hub of the output gear 50. The locking ring 27 simultaneously moves over the ramps 69 of the series of blocking pins 29 into a position to force the frictional clutching ring 28 into synchronous engagement with the rear output-gear 50. Thus, when the ring 28 is locked in its synchronized operating position, the gear 50 is supplied with driving power from the rear wheel output-shaft 31 by way of the synchronizer collar 26, through the matching splines 30 and 51 of the locking ring 27 and the gear 50.

The shift-rod 55 extends to the exterior of the casing 10 through a seal 74 and is moveable by a shift control lever (not shown) into four different positions, namely two-wheel high, four-wheel high, neutral and four-wheel low positions represented by the symbols 2 Hi, 4 Hi, N and 4 Lo, respectively. The rod is maintained against slippage from each such position by a spring biased poppet ball (not shown) which makes a secured engagement with a matching curved depression located to properly interassociate the components of the gear assembly for each of the positions represented by the symbols.

Another poppet ball 70 which provides a principal locking action is located in a matching opening 71 in the sleeve 63 and is moveable therein cooperatively between a matching slot 72 in the moveable shift-rod 55 and a fixed locking depression 73 in the wall of a cylindrical portion of the case 10 which supports the rod within the case 10.

The opening 71, the locking slot 72 and the locking depression 73 are located to hold the synchronizer 25 locked in each of its driving positions as well as neutral position and during a short delayed shift for release of windup stresses which may be experienced during shifting from the four-wheel high to the two-wheel high driving positions as hereinafter described in more detail.

OPERATION

Two Wheel High Position

When the gear assembly is in the two-wheel high (2 Hi) driving position, as shown in FIG. 4 for economical driving of the vehicle over improved surfaces, the flow path for power supplied from the input drive shaft 20 is directly to the rear-output shaft 31 since the input drive gear 40 in this position of the shift-rod 55 is held in bridging splined relation as a driving connection collar between the ends of the shafts 20 and 31. The gear 40 is held in its bridging relation by a poppet ball engagement of a depression in the 2 Hi position on the shift-rod 55. In this position, the fork sleeve 61 compresses the coil spring 65 against the synchronizer fork sleeve 63 thereby moving the synchronizer to an inactive position. The sleeve 63 is locked against further movement by its abutment against the poppet ball 70 at the end of slot 72. Thus the rear wheels are driven in a one-to-one rotational ratio relation between the input shaft 20 and the rear output shaft 31.

Four wheel High Position

Figure 5:
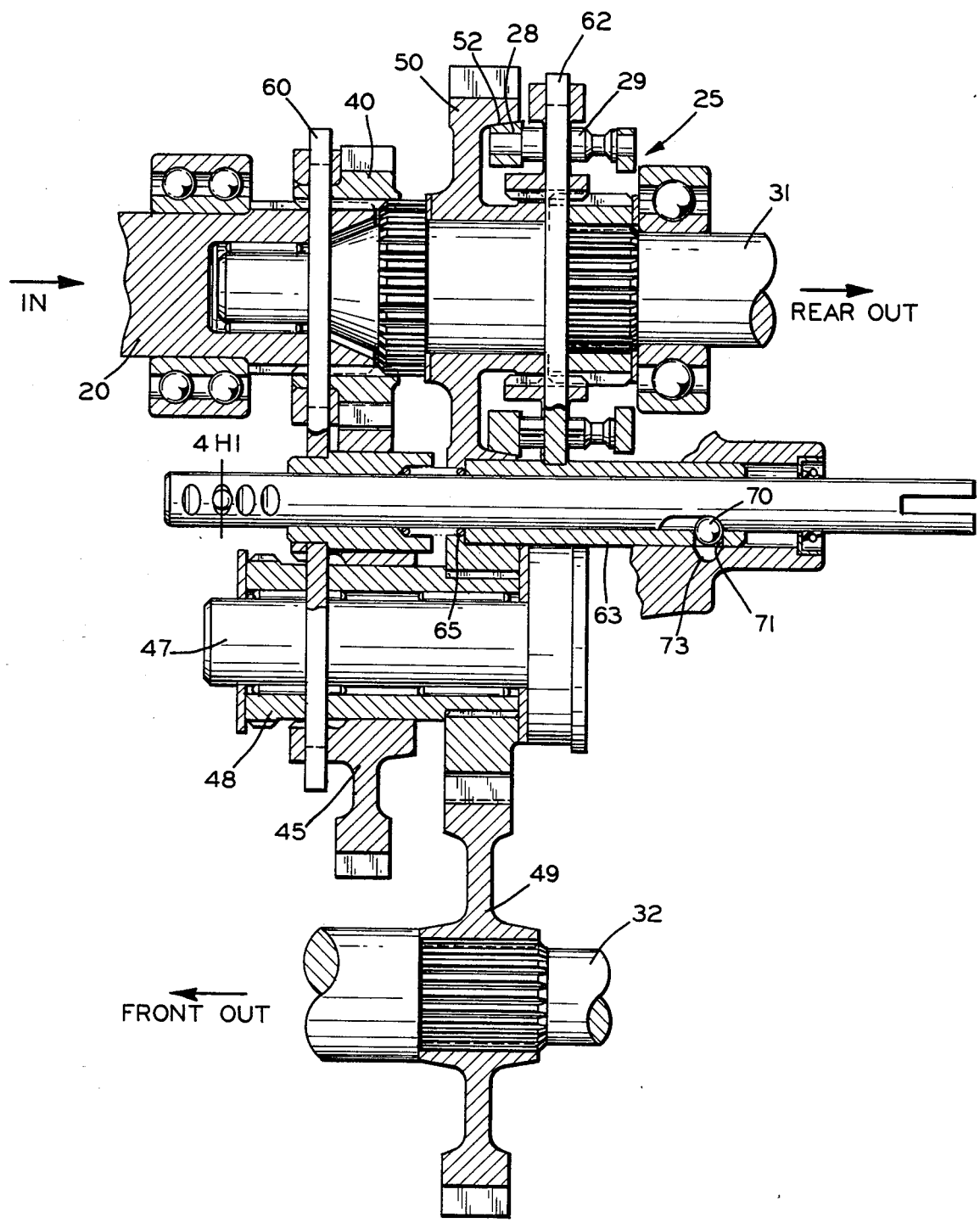
FIG. 5 is a view of the gear assembly of FIG. 4 showing the shift-rod position and engagement of gears to effect four-wheel high speed drive of the vehicle.

The power flow through the gear assembly can be shifted from a two-wheel to a four-wheel driving relation shown in FIG. 5 while the vehicle is in motion since the shift is effected through activation of the clutch action of the synchronizer 25 to bring the two additional wheels into driving relation. In detail, movement of the shift rod 55 to its four-wheel high position results in corresponding movement of the sleeve 63 and fork 62 to activate the synchronizer and to thereby bring the rear output gear 50 up to the rotational speed of and to be driven by the rear output shaft 31. The constant mesh set of gears 50, 46 and 49 is thus driven by the shaft 31 resulting in rotational power being supplied to the output shaft 32 and correspondingly to the front wheels 16 of the vehicle. The gears 49 and 50 have the same number of teeth and thus both the rear and front output shafts 31 and 32 are driven at the same rotational speeds.

Although the four high positioning of the shift-rod 55 results in lateral movement of the sleeve 61 and the fork 60 as well as the set of gears 40 and 45, the set is not moved sufficiently to separate the gear 40 from its bridging relation as a driving collar between the ends of the shafts 20 and 31. The gear 45 in this position continues to act as an inactive idler. The sleeve 63 and the fork 62 are locked in this activated synchronizer position by the poppet ball 70 which can make engagement with either the locking depression 73 or the end of the slot 70.

Neutral Position

Figure 6:
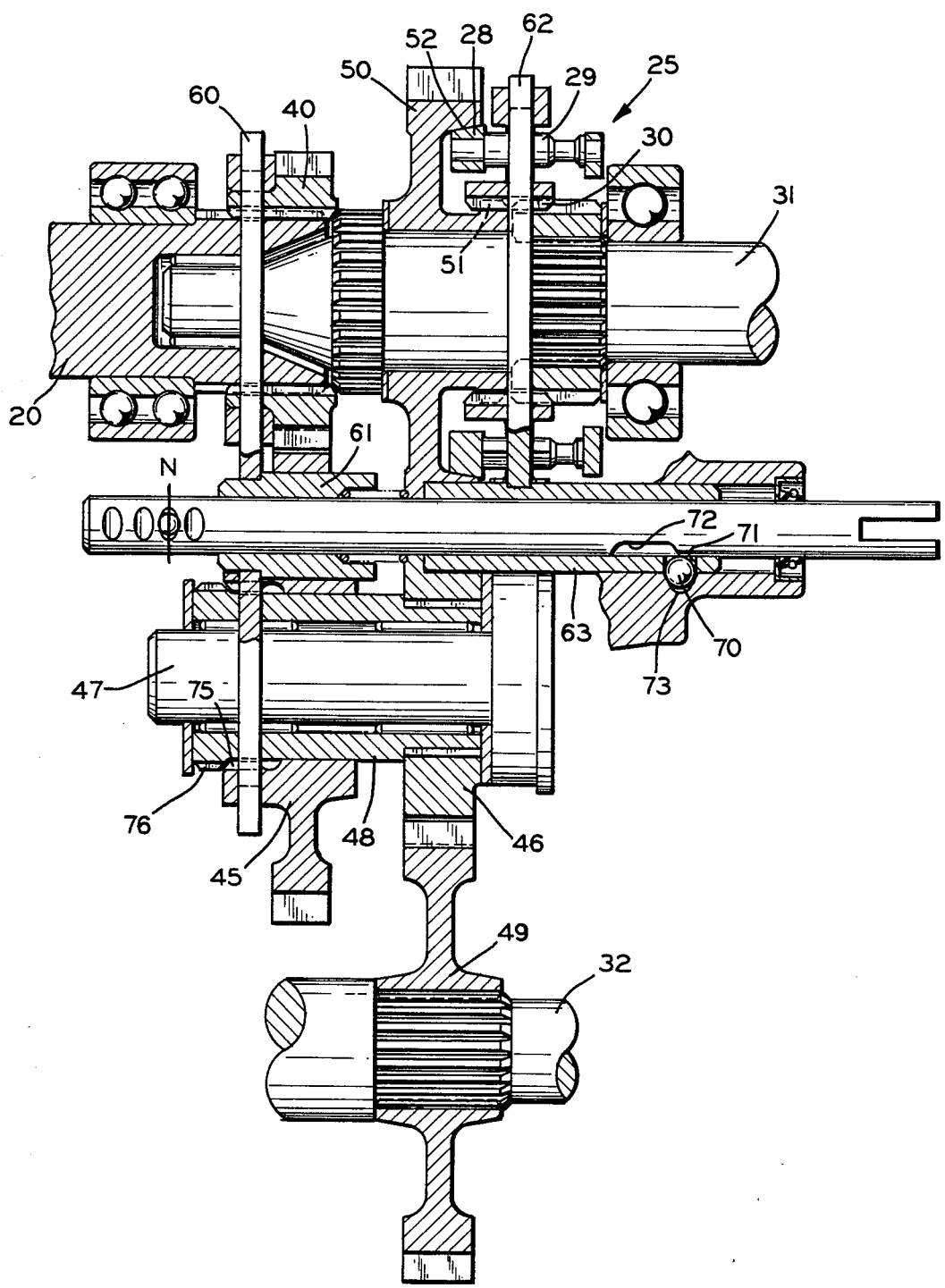
FIG. 6 is a view of the gear assembly of FIG. 4 showing the shift-rod location and engagement of gears for neutral position of the vehicle.

When the shift-rod 55 is moved to a neutral position shown in FIG. 6, the gear 40 is disengaged from the splines 41 of the shaft 31 by the fork 60. Thus the input drive shaft 20 rotates only the constant mesh set of gears 40 and 45 in an inactive mode. The synchronizer 25 is maintained in its activated mode in this position of the shift-rod 55 by the poppet ball being locked in the depression 73, thereby holding the sleeve 63 and fork 62 in the locked operating position of the synchronizer.

Four Wheel Low

Figure 7:
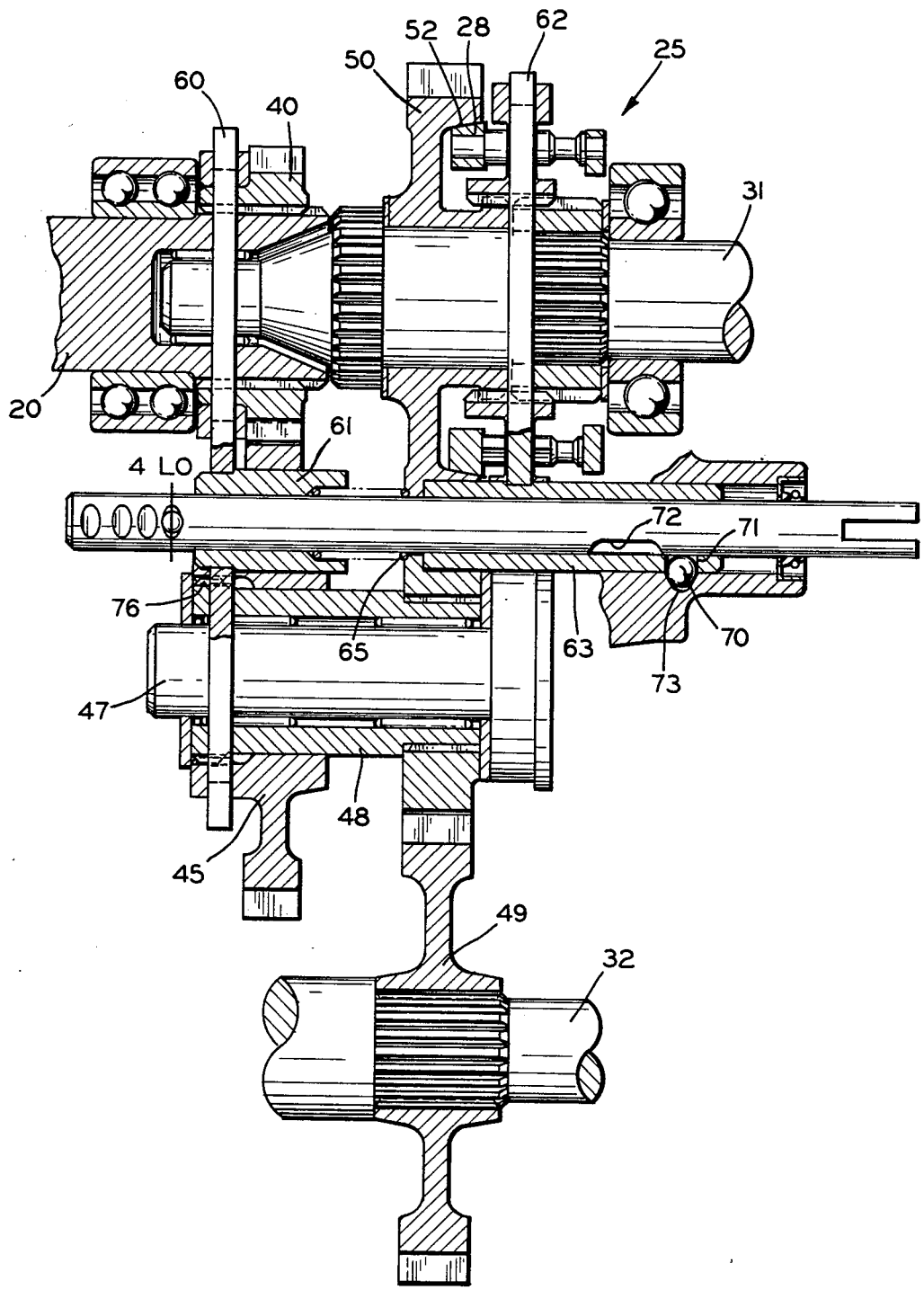
FIG. 7 is a view of the gear assembly of FIG. 4 with the shift-rod position and engagement of gears for low-speed four-wheel drive of the vehicle.

For operation of the vehicle under rough conditions such as in sand or mud, the shift-rod is moved to its four-wheel low position from the neutral position of the assembly while the vehicle is stopped. The shift to this position requires manual application of force to the shift control rod until the shift is made since a set of teeth 75 on the interior of the hub of the low range idler gear 45 (more clearly seen in FIG. 6) must come into engagement with a matching set of teeth 76 on the idler shaft 48 to effect the split of power flow to both front and rear output shafts. As shown in FIG. 7, in the four-wheel low position of the shift-rod 55, the fork 60 holds the input drive gear 40 fully in driven relation on the drive shaft 20. The low range idler gear 45 constantly meshed with gear 40 therefore is supplied with driving power and in turn drives the idler shaft 48 and the idler gear 46 fixedly splined thereto. Thus both the front and rear output gears 49 and 50, respectively are supplied with power. The output gear 49 thereby supplies direct driving power to the front output shaft 32 while the rear output gear 50 supplies driving power to the rear output shaft 31 through the locked in synchronizer 25. The gears 49 and 50 are made to have the same number of teeth meshed with the driven idler gear 46 and thus drive the output shafts 31 and 32 at the same rotational speeds.

The high torque power supply from the unit in this position results from the proportionately smaller diameter of the input drive gear compared to that of the idler gear 45. By way of example, the ratio of sizes may be 1 to 2.6 to produce a torque increase of approximately 2.6 to 1.

As described above, the shift rod 55 moves the gears 40 and 45 into their four-wheel drive positions under manually applied force. Non-injurious meshing of gear teeth 75 and 76 can occur under this condition because of the shift taking place at a slow rotational speed of the input shaft 20 while the vehicle is stopped. When the gears 40 and 45 are in their four-wheel operating position, the sleeve 61 on rod 55 is held separated from its close spring biased adjacency with sleeve 63. The sleeve 63 is then held in independantly locked position holding the synchronizer in positive activated mode by the poppet ball 70 which is itself locked in the opening 71 and locking depression 73, thus preventing movement of the sleeve 63.

Four Wheel High To Two Wheel High

Figure 8:
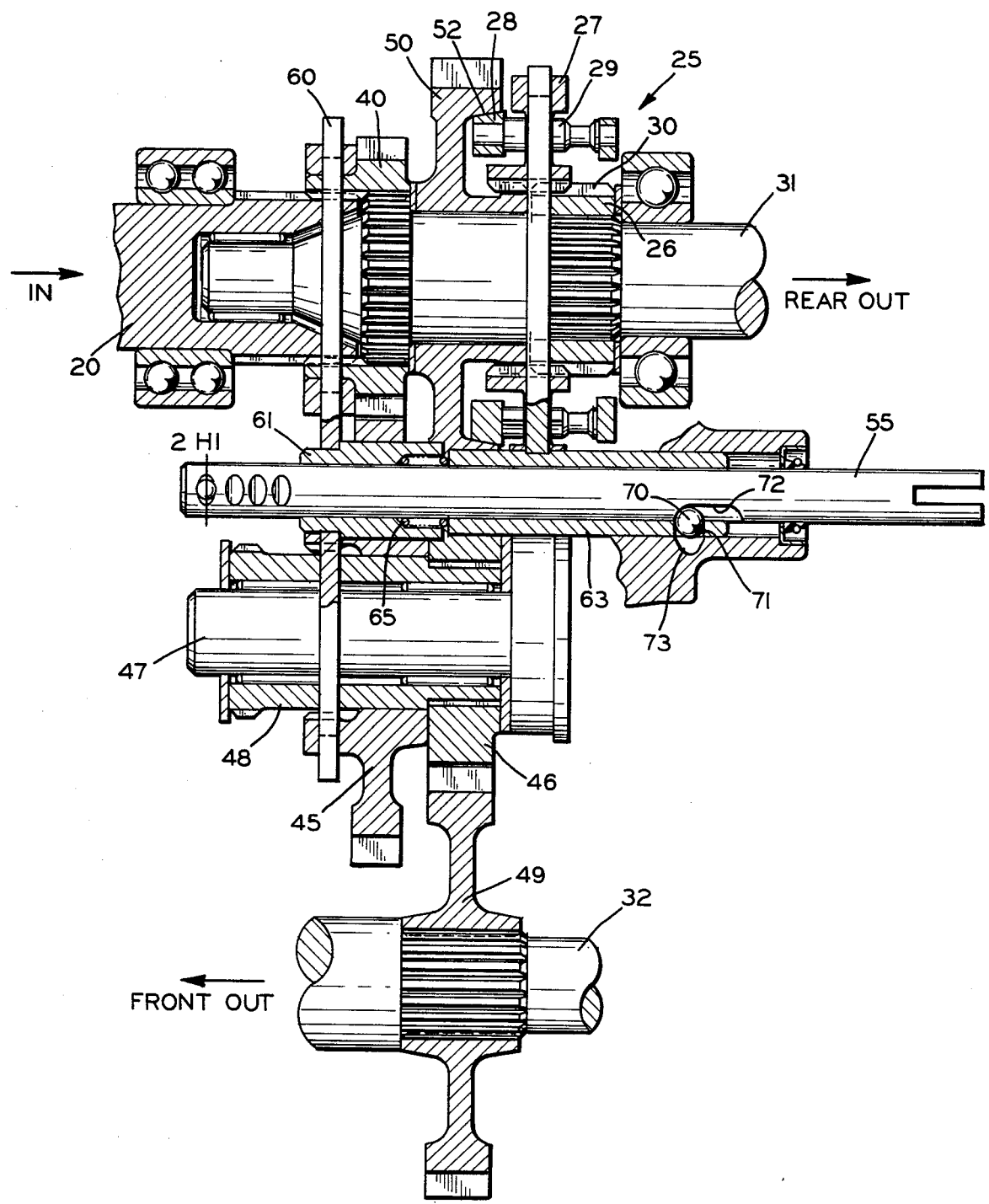
FIG. 8 is a view of the gear assembly of FIG. 4 showing the shift-rod position and gear relation for release of axle windup stresses during shift from four-wheel high to two-wheel high drive.

In operating the gear transfer unit 10 in a four-wheel high driving position, windup stresses can be experienced within the gear assembly such as can result from turning the vehicle under conditions which result in the front wheels travelling a greater distance than the rear wheels. Although in normal course such stresses are naturally gradually relieved over a short period of ordinary driving, such stresses make shifting difficult, if not impossible. As shown in FIG. 8, the spring 65 between the sleeves 61 and 63 is fully compressed upon shift of the rod 55 positioned by the locking poppet ball arrangement, not shown, to two-wheel from the four-wheel drive position, and normally under no stress conditions will force the fork 62 into a non-engaging position for the synchronizer as in FIG. 4. Because of the windup stresses in the system, which result in extra friction between the splines 30 of synchronizer collar 26, immediate release of the synchronizer to an inactive position does not occur. A delayed automatic shift does occur, however, under the force influence of the compressed spring 65, as soon as the stresses are relieved sufficiently in normal driving to allow the fork to move laterally on the splined collar 26 to disengage the synchronizer 25 from its driving relation with the gear 50. The assembly thereupon takes on the positioning of gears and synchronizer for a two-wheel drive relation as described in reference to FIG. 4.

During the shift from a four high to two-wheel drive position, the shift rod is moved to a position where the poppet ball slot 72 is positioned to allow release of the ball 70 from the depression 73. This correspondingly releases the previously blocked sleeve 63 for the synchronizer deactivating movement of the fork 62 to the limit allowed by movement of the ball in the opening 71 to the opposite end of the slot 72 as shown in FIG. 5.

Although the drawings and description of the invention are herein presented in relation to use in a specific vehicle drive arrangement, it will be recognized that the principles of the invention are adaptable as well to use in other vehicle drive arrangements. In view of the foregoing it will be understood that many variations of the arrangement of our invention can be provided within the broad scope of the principles embodied therein. Thus, while a particular preferred embodiment of our invention has been shown and described, it is intended by the appended claims to cover all such modifications which fall within the true spirit and scope of the invention.

I claim:

1. A gear transfer assembly for selectively shifting a power driven vehicle between a two-wheel or four-wheel drive mode comprising a casing incorporating a power input shaft,
   a first output shaft for a first pair of wheels and a second output shaft for a second pair of wheels,
   means for connecting said input shaft and said first output shaft in power driven relation for driving the first two wheels of the vehicle,
   a gear set comprising three constant mesh gears including an output gear for said first wheels mounted in freely rotatable relation on said first output shaft, an intermediate idler gear having a meshed relation with said first output gear and an idler shaft on which said idler gear is mounted and a second output gear for said second wheels fixed to said second output shaft having a meshed relation with said intermediate idler gear,
   a synchronizer fixed to said first output shaft for rotation thereby, said synchronizer being engageable in driving relation with said first output gear whereby said gear set and second output shaft can be driven by said input drive shaft through said first output shaft and,
   means for activating said synchronizer to effect its engagement with said first output gear whereby the assembly can be selectively shifted to drive the vehicle with either two or four-wheels.

2. A gear transfer assembly as set forth in claim 1 wherein said input drive shaft and first output shaft are aligned with a hollow section provided in the end of one and the end of the other being matched in shape to project in close spaced relation in said hollow section and a bearing provided in the close space therebetween providing mutual support of said shafts.

3. A gear transfer assembly as set forth in claim 1 wherein said input and first output shafts are axially aligned in close spaced end-to-end relation and said means for connecting said input and first output shafts comprises a member slideably splined in bridging relation across the ends of said input and first output shafts, and being selectively positionable wholely on at least one of said shafts whereby said member can be slideably disconnected from said first output shaft to provide a neutral position for said assembly.

4. A gear transfer assembly as set forth in claim 3 wherein said connecting member is a power input gear and wherein said intermediate idler gear is fixed to said idler shaft and a second idler gear is mounted in freely rotatable slideable relation on said idler shaft, said input gear and second idler gear being laterally slideable together in constant meshed relation on their respective shafts, said second idler gear having a second set of teeth, said idler shaft having a matching set of gear teeth within range of lateral movement of said second idler gear for meshed driving engagement with said second teeth of said second idler gear, said input drive gear having a substantially lesser number of teeth than its constant meshed second idler gear, whereby said assembly is shifted into a high torque slower speed drive of said first and second pairs of wheels upon meshed engagement of the second teeth of said second idler gear with said matching teeth of said idler shaft.

5. A gear transfer assembly as set forth in claim 4 wherein the second teeth of said second idler gear are disposed on the interior of the hub thereof and the matching set of teeth are disposed circumferentially about said idler shaft.

6. A gear transfer assembly as set forth in claim 4 including a lengthwise moveable gear shift rod, a synchronizer actuating member fixed on a first support member mounted on and moveable with said shift rod, and a gear shift member fixed on a second support member mounted on and moveable with said shift rod, said gear shift member being in engagement with the constant meshed set of said input gear and second idler gear to effect lateral movement of both in unison subject to movement of said shift rod whereby said assembly can be selectively shifted from a two-wheel driving mode to a four-wheel driving mode while in motion, and vice versa in addition to a neutral mode and a four-wheel high-torque drive mode.

7. A gear transfer assembly as set forth in claim 6 wherein said first support member is slideable on said shift rod and is provided with cooperative poppet ball means arranged to selectively lock said first support member to said shift rod for operation of said synchronizer in preset positions of said shift rod.

8. A gear transfer assembly as set forth in claim 7 whereby a biasing spring is provided between said first and second support members to bias said first support member and the synchronizer actuating member mounted thereon in the direction away from said first support member, the biasing force of said spring being sufficient to disengage said synchronizer from an actuated condition when the synchronizer is in a low stressed driving condition but insufficient to disengage the synchronizer when in a stressed driving condition above a predetermined level at which damage might result from too great a mismatch in gear speeds during shifting from a four-wheel to a two-wheel drive condition while the vehicle is in motion.

9. A gear transfer assembly as set forth in claim 1 wherein said synchronizer comprises a friction clutching member rotated by said synchronizer and laterally moveable into frictional engagement with a matching surface of said first output gear to bring said clutching member and first output gear into substantially matched speed relation.

10. A gear transfer assembly as set forth in claim 9 wherein said clutching member is a frictional clutch ring and said synchronizer includes a laterally moveable second ring for support and rotation of said clutch ring, said second ring having internal gear teeth, said first output gear having a second set of teeth on its hub for meshed engagement with said internal gear teeth whereby said second teeth can mesh in driving relation with the internal teeth of said second ring upon matching of speeds and lateral engaging movement of said clutch ring with said first output gear.

11. A gear transfer assembly as set forth in claim 10 wherein said means for activating said synchronizer comprises an actuating member mounted on a lengthwise moveable shift rod arranged to engage and move said clutch ring into engagement with said first output gear subject to corresponding movement of said shift rod.

12. A gear transfer assembly as set forth in claim 10 wherein said means for effecting engagement of said first output gear with said synchronizer comprises a lengthwise moveable gear shift rod, a synchronizer actuating member fixed to a support member slideably mounted on and moveable with said shift rod and at least one poppet ball associated with said shift rod and support member adapted to selectively lock said support member in fixed relation with said casing to maintain said synchronizer in activated relation with said first output gear.

13. A gear transfer assembly for selectively shifting a power driven vehicle between a drive relation by one or two sets of wheels comprising a casing incorporating a power input shaft, one drive shaft for a first set of wheels and another drive shaft for a second set of wheels, connection means providing a driving connection between said input shaft and said one drive shaft for said first wheels, a gear set of three constantly meshed gears adaptable to supply power to said other drive shaft comprising one output gear for said first wheels mounted in freely rotating relation on said one output shaft, an intermediate gear meshed with said one output gear and another output gear for said second wheels fixed to said other output shaft meshed with said intermediate gear, and means for selectively connecting said one output gear in direct driven relation with said one output shaft to drive the other output shaft together therewith whereby said assembly can be shifted to drive the vehicle with either one or both sets of wheels, said selective connecting means comprising a synchronizer fixed on and rotated with said one output shaft for selective synchronized engagement with and supply of power to said one output gear.

14. A gear transfer assembly for selectively shifting a power driven vehicle between a drive relation by one or two sets of wheels comprising a casing incorporating a power input shaft, one drive shaft for a first set of wheels and another drive shaft for a second set of wheels, said input shaft and one drive shaft for said first wheels being axially aligned in close-spaced end-to-end relation, a connection member providing a direct drive connection between said input shaft and said one drive shaft for said first wheels, a gear set of three constantly meshed gears adaptable to supply power to said other drive shaft comprising one output gear for said first wheels mounted in freely rotating relation on said one output shaft, an intermediate gear meshed with said one output gear and another output gear for said second wheels fixed to said other output shaft meshed with said intermediate gear, and means for selectively connecting said one output gear in direct driven relation with said one output shaft to drive the other output shaft together therewith whereby said assembly can be shifted to drive the vehicle with either one or both sets of wheels, said selective connecting means comprising a synchronizer fixed on and rotated with said one output shaft for selective synchronized engagement with and supply of power to said one output gear.

15. A gear transfer assembly as set forth in claim 14 wherein the number of teeth on said other output gear is such in relation to the number of teeth on said one output gear that the peripheral speeds of said second and first wheels are substantially the same.

* * * * *

UNITED STATES PATENT AND TRADEMARK OFFICE
CERTIFICATE OF CORRECTION

PATENT NO. : 4,559,846

DATED : December 24, 1985

INVENTOR(S) : Stephen C. Cochran and Francis J. Terwoerds

It is certified that error appears in the above-identified patent and that said Letters Patent is hereby corrected as shown below:

Add the following claims which should have been included in the patent as originally printed:

16. A gear transfer assembly for selectively shifting a power driven vehicle between a two-wheel or four-wheel drive relation comprising a casing incorporating a power input shaft, a rear-wheel drive shaft and a front-wheel drive shaft, said input and rear-wheel drive shafts being axially aligned in close spaced end-to-end relation, a member for connecting the ends of both said input and rear-wheel drive shafts for driving the rear two wheels of the vehicle, a gear set of three constant mesh gears comprising a rear output gear mounted in freely rotatable relation on said rear output shaft, an intermediate idler gear meshed with said rear output gear and an idler shaft on which said intermediate gear is mounted and a front output gear fixed to said front-wheel output shaft meshed with said intermediate idler gear, a synchronizer fixed to said rear output shaft for rotation thereby, said synchronizer being engageable in driving relation with said rear output gear whereby said gear set and front output shaft are driveable by said input drive shaft through said rear output shaft and means for selectively effecting engagement of said rear output gear with said synchronizer whereby the assembly can be shifted to drive the vehicle with either two or four-wheels.

17. A gear transfer assembly as set forth in Claim 16 wherein said intermediate gear is fixed to said idler shaft and a second idler gear is mounted in freely rotatable slideable relation on said idler shaft, said connecting member being an input gear slideably splined in bridging power driving relation on the ends of both said input and rear wheel drive shafts, said second idler gear being arranged in constant mesh relation with said input gear, said input gear and second idler gear being laterally slideable together

UNITED STATES PATENT AND TRADEMARK OFFICE
CERTIFICATE OF CORRECTION

PATENT NO. : 4,559,846

DATED : December 24, 1985

INVENTOR(S) : Stephen C. Cochran and Francis J. Terwoerds

Page 2 of 2

It is certified that error appears in the above-identified patent and that said Letters Patent is hereby corrected as shown below:

in constant meshed relation on their respective shafts, said second idler gear having a second set of teeth, said idler shaft having a matching set of gear teeth disposed within range of lateral movement of said second idler gear for meshed driving engagement with said second teeth of said second idler gear, said input drive gear having a substantially lesser number of teeth meshed with those of its constant meshed second idler gear, whereby said assembly is shifted into a high-torque slow speed four-wheel drive upon meshed engagement of the second teeth of said second idler gear with said matching teeth of said idler shaft.

Signed and Sealed this

Thirteenth Day of October, 1987

Attest:

DONALD J. QUIGG

Attesting Officer

Commissioner of Patents and Trademarks